J. L. MUSSER.
APPARATUS FOR TREATING CLAY.
APPLICATION FILED MAR. 3, 1911.
1,029,708.
Patented June 18, 1912.
3 SHEETS—SHEET 3.
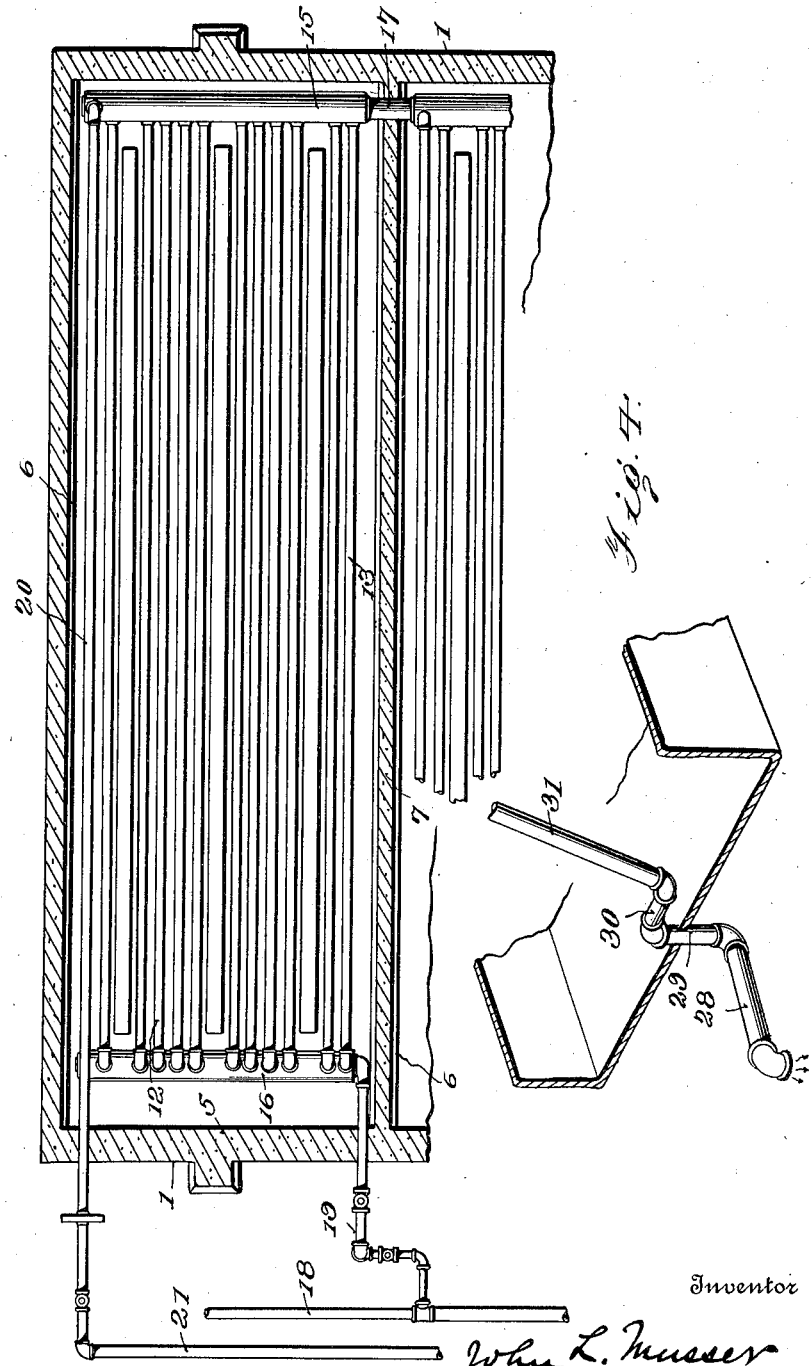

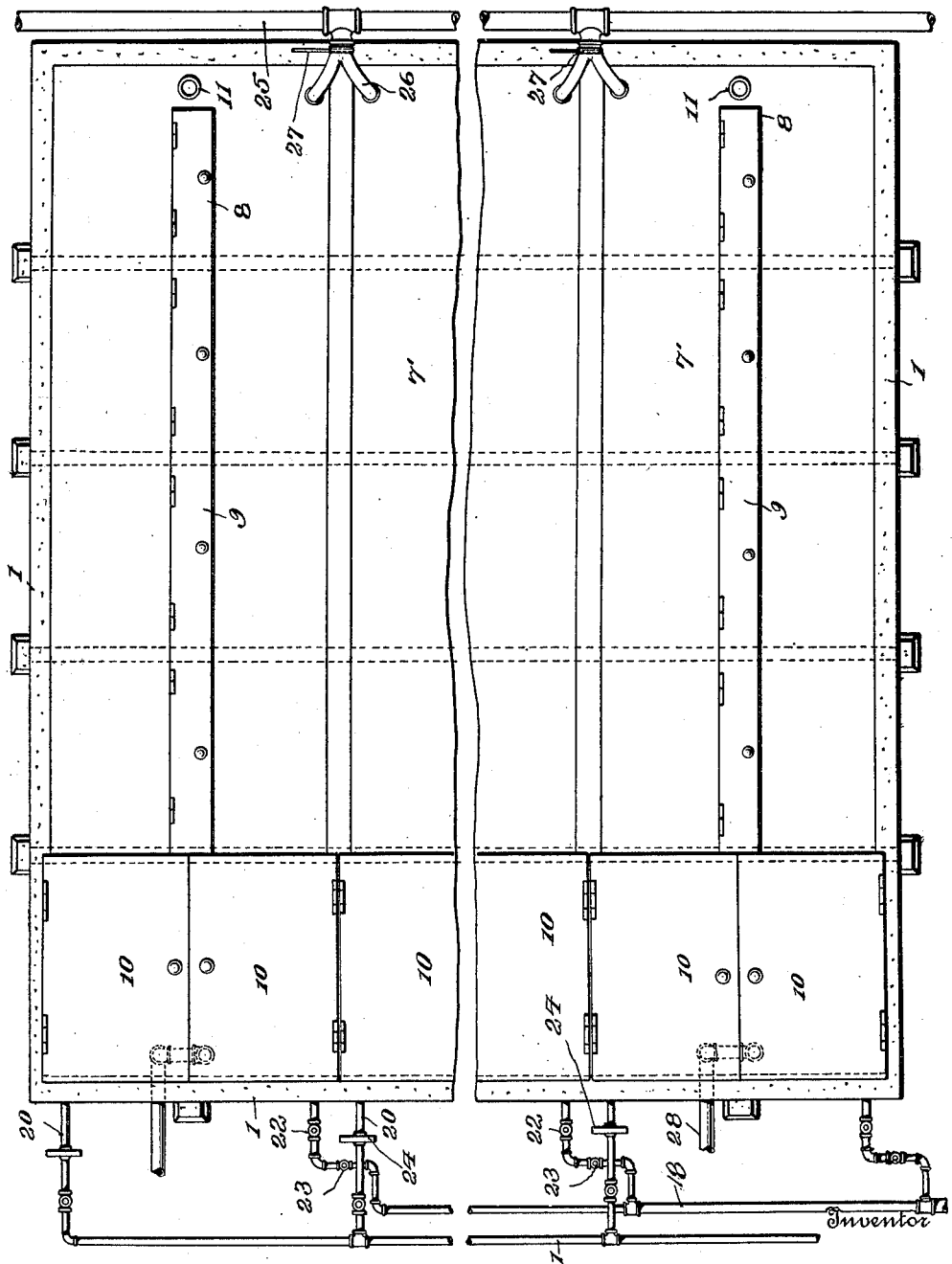

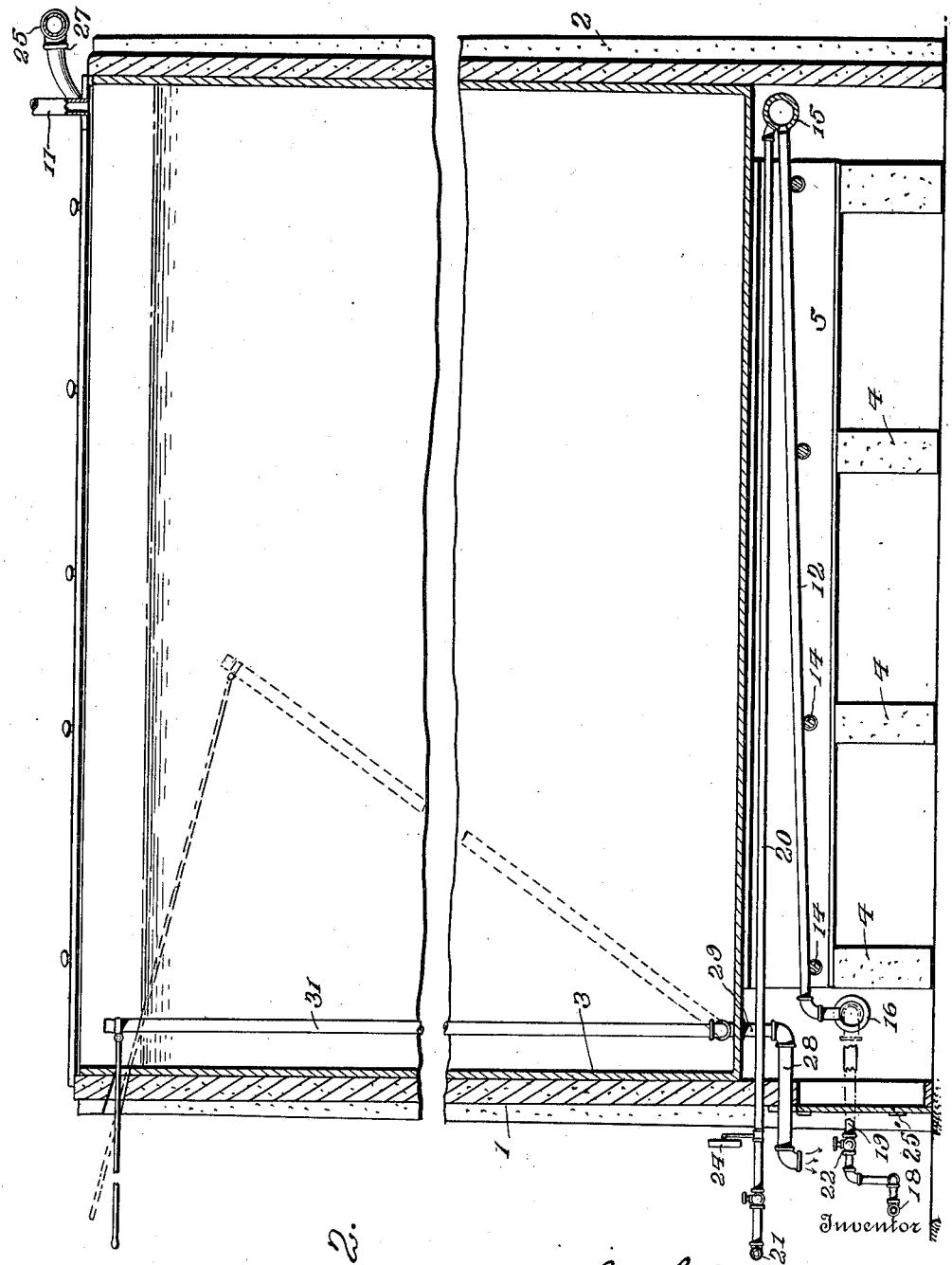

UNITED STATES PATENT OFFICE.

JOHN L. MUSSER, OF LANCASTER, PENNSYLVANIA.

APPARATUS FOR TREATING CLAY.

1,029,708.  Specification of Letters Patent.  Patented June 18, 1912.

Application filed March 3, 1911. Serial No. 612,113.

*To all whom it may concern:*

Be it known that I, JOHN L. MUSSER, a citizen of the United States, residing at Lancaster, in the county of Lancaster and State of Pennsylvania, have invented certain new and useful Improvements in Apparatus for Treating Clay, of which the following is a specification.

The invention relates to an apparatus for treating clay; and it consists of a number of tanks arranged and supported side by side and provided with a suitable heating system, each tank being provided with a novelly-constructed and arranged device for drawing off or draining the water from the tank.

The chief object of the invention is to effect a saving of both time and labor in the preparation of clay for manufacturing purposes, and to produce a more refined article than has heretofore been produced.

In the drawings—Figure 1 is a top plan view broken transversely; Fig. 2 is a vertical section, also broken; Fig. 3 is a top plan view of a heating device, beneath one of the tanks or compartments. Fig. 4 is a detail perspective view of the drain-pipe and connections.

Referring to the drawings, the numeral 1 designates the walls of a structure, preferably concrete or cement, strengthened by vertical beams 2. Within the structure, I provide a series of tanks 3, preferably of metal, said tanks being supported upon a suitable foundation, such as piers 4 and I-beams 5, the outer edges of the two outer tanks being supported upon ledges 6, only one being shown—see Fig. 3—on the end walls of the cement structure. After the tanks are put in place, within the walls of the cement structure, I preferably fill in the spaces between the tanks with a cement filling, producing partition walls 7. The tanks are identical in construction and the heating apparatus beneath the tanks are also identical, so that a description of a section such as illustrated in Fig. 3, in conjunction with the outside pipe arrangement shown in Fig. 1, will suffice to clearly describe the whole apparatus. Each tank 3 is provided with a fixed cover 7', having a longitudinal opening 8 therein, of sufficient width to permit an operative to insert a suitable instrument to stir or agitate the floating material in the tank, as may be desirable in carrying out the process. This longitudinal opening 8 is covered by a narrow hinged cover 9. The remaining portion of the tank is provided with oppositely opening hinged covers or doors 10, through which access to the tank is had to permit the refined product to be removed. The fixed cover of each tank or compartment is provided with an inlet 11, through which the clay solution may be introduced into the tank, after leaving the "floating" apparatus.

Referring particularly to Figs. 2 and 3, the numeral 12 designates a heating system, preferably steam, comprising a number of pipes 13, supported upon transverse rods 14, extending through openings in the sides of the respective I-beams, partition walls and end walls of the cement structure, the pipes in the several sections (one section for each tank), being in communication with a manifold 15 at one end, and with a manifold 16 at the other end. The manifolds of each adjacent tank are in communication with each other, by nipples 17. The manifolds 16 of the various sections are connected with a return pipe 18, by a series of valved connections 19. The manifolds 15 are located at a higher level than the manifolds 16, and consequently, the pipes 13 are supported in a downwardly inclined direction, thus facilitating the drainage of all of the pipes in the various sections. Steam entering the first of the manifolds 15, through the feed-pipe 20, fed from main steam pipe 21, will pass through all of the manifolds 15, and through the pipes 13 of the various sections, to the front manifolds 16. Each connection 19 coming from the manifolds 16 is provided with a valve 22, by which the flow of steam through the pipes 13 may be regulated or cut off entirely to throw out of action the radiator of any particular tank. Interposed in each connection, between the manifolds 16 and the steam return pipe 18, is a check-valve 23, automatically operated as a check against back pressure and which is adapted to be opened more or less, according to the suction or vacuum forming tendency of a suitable vacuum pump, which I connect with the steam return pipe 18. The pipes of the connections 19 that run into the manifolds, are of greater diameter or capacity than the pipes which are connected with the return pipe, or in actual practice, the pipe connected with the manifold will be about one and one-half inches in diameter, whereas the pipes between said first mentioned pipe and the return pipe will be reduced to about one inch, likewise the sections of the return pipe 18, between the various tanks, are varied in size or capacity, starting with about one inch pipe leading from the end pipe-section of the heating system, to a one and one-fourth inch pipe for the second pipe section and increasing at the same rate, throughout the whole system, thus equalizing the vacuum or suction throughout the entire battery of tanks, and maintaining under ordinary conditions the same temperature in each. I preferably place a steam gage 24 in each feed pipe, whereby the pressure in each pipe section for each tank may be seen at a glance.

The numeral 25 designates an exhaust pipe which extends along the rear side of the battery of tanks, outside the cement walls. To this pipe, I connect a suitable pump or fan. Connected at intervals with the pipe 25 is a series of Y-connections 26, the pipes 27 of which extend through suitably packed openings in the fixed covers of the various tanks, the arrangement being such that the pipes 26 of each Y-connection will draw from the two adjacent tanks. Each Y-connection is provided with a sliding damper 27 by which communication between the tanks and the pipe 25 may be regulated or cut off entirely, as for instance, as would be desirable where the apparatus was not working to its full capacity or where several of the tanks, one or more, are out of commission.

For each tank I provide a drain-pipe 28, connected by an elbow to a short vertical pipe 29 which in turn is similarly connected to a short horizontal pipe 30, the latter being connected by an elbow to an adjustable pipe 31, which, as shown more clearly in Figs. 2 and 4, may be moved in the direction of the length of the tank, so as to bring its open upper end to the level of the water and other matter to be drained from the tank, after the purified clay has been precipitated. The pipe 31 is arranged to rock on the threads in the connecting elbows and short pipe 30. The upper end of the pipe has preferably attached thereto a rod which comes through an opening in the front of the tank and through the wall of the cement structure, by which the operator from the outside may manipulate the drain pipe, as the level of the water in the tank is lowered, the range of movement of the pipe 31 being such that it will drain from the highest to the lowest water level in the tank, according to the exigencies of the case. Preferably the cross-rods 14 are made removable, so that the heating pipes and manifolds of each tank section may be dropped to facilitate any repairs or for other purposes. I provide for each tank, a man-hole 25', in the front wall of the cement structure, whereby each heating section may be accessible to make repairs, or for other purposes.

In operation, the tanks are filled with the clay solution, through inlet openings 11, to the desired height. Steam is then turned on through the main steam pipe 21 and is fed through the various feed pipes 20, through the manifolds 15, and pipes 13, and is drawn through the various pipe sections through the connections 20 which run into the return steam pipe 18, through the various globe valves, and check valves interposed in the connections. A sufficient temperature is maintained under the various tanks for a sufficient length of time to completely separate the particles of clay and permit the vegetable and other undesirable matter of less specific gravity than the clay, to gradually rise to the top, while clay settles to the bottom. When the clay is thoroughly purified and has precipitated to the bottom of the tank, the water, with its contained impurities, is drawn off through the drain pipe 31. After the water has been completely drawn off and nothing is left in the tank but the purified clay, the heat is maintained for a sufficient time thereafter to remove all of the moisture from the clay, which will rise in the tanks and be exhausted through the Y-connections 26, which are in communication with the exit pipe 25. When the clay has become sufficiently dry for handling the hinged doors or covers 10 are opened to permit the entrance of buckets carried by suitable crane devices, into which buckets the refined clay is loaded and removed from the tanks.

Having thus described my invention, what I claim is:

1. An apparatus for treating clay, having in combination a tank provided with hinged covers, a heater arranged beneath said tank, a drain-pipe comprising a pipe fixed in the bottom of the tank and provided with an elbow, and a pipe rockable on said elbow, said rockable-pipe being adjustable in the direction of the length of the tank, and means for adjusting the rockable-pipe to any water level.

2. An apparatus for treating clay, having in combination a tank provided with hinged covers, a heater arranged beneath said tank, a drain-pipe comprising a pipe fixed in the forward portion of the bottom of the tank and provided with an elbow, and a pipe rockably-connected to said elbow, said rockable-pipe being adjustable in the direction of the length of the tank, means for adjusting the rockable-pipe to any water level, and means for withdrawing the moisture from the tank.

3. An apparatus for treating clay, comprising a plurality of tanks having suitable covers, a heater situated beneath each tank, the several heaters being coupled up together, valves for throwing out of action the heater of any particular tank, a drain-pipe for each tank, each drain-pipe consisting of a pipe fixed in the bottom of its tank and provided with an elbow, and a pipe rockable on said elbow, said rockable-pipe being adjustable in the direction of the length of the tank, and means for adjusting the rockable-pipe to any water level.

4. An apparatus for treating clay, comprising a plurality of tanks having hinged covers, a heater arranged beneath each tank, the several heaters being coupled up together, valves for throwing out of action the heater of any particular tank, a drain-pipe for each tank, each drain-pipe consisting of a pipe fixed in the forward portion of the bottom of the tank and provided with an elbow, and a pipe rockably-connected with said elbow, said rockable-pipe being adjustable in the direction of the length of the tank, means for adjusting the rockable-pipe to any water level, and means for withdrawing the moisture from each tank.

In testimony whereof I affix my signature in presence of two witnesses.

JOHN L. MUSSER.

Witnesses:
FRANCIS S. MAGUIRE,
FRANK G. BRERETON.

Copies of this patent may be obtained for five cents each, by addressing the "Commissioner of Patents, Washington, D. C."